United States Patent [19]

Farreras et al.

[11] 3,898,560

[45] Aug. 5, 1975

[54] APPARATUS FOR TESTING ROTORS OF ELECTRIC MOTORS

[75] Inventors: Vicente Palazon Farreras; Jose Pons Soley, both of Barcelona, Spain

[73] Assignee: Unidad Hermetica, S.A., Sabadell (Barcelona), Spain

[22] Filed: June 6, 1973

[21] Appl. No.: 367,330

[30] Foreign Application Priority Data
Aug. 16, 1972 Spain .................................... 406347

[52] U.S. Cl. ............................ 324/158 MG; 324/51
[51] Int. Cl. ............................................. G01r 31/02
[58] Field of Search .......... 324/158 MG, 55, 74, 51; 318/490; 322/99

[56] References Cited
UNITED STATES PATENTS

| | | | |
|---|---|---|---|
| 2,568,406 | 9/1951 | Packer et al. ............. | 324/158 MG |
| 2,609,927 | 9/1952 | Whelchel .................. | 324/158 MG |
| 2,724,801 | 11/1955 | Oster ........................ | 324/158 MG |
| 2,844,794 | 7/1958 | Wright et al. ............. | 324/158 MG |

OTHER PUBLICATIONS

Musson et al.; "Recent Developments . . . "; Proc. of the Inst. of Electrical Engs.; April 1950; pp. 97–107.

*Primary Examiner*—Alfred E. Smith
*Assistant Examiner*—Ernest F. Karlsen
*Attorney, Agent, or Firm*—Steinberg & Blake

[57] ABSTRACT

Apparatus for testing rotors of electric motors in cyclic operation according to a predetermined program of events in which the rotor to be tested is clamped to the end of a shaft arranged to be driven during the test, the rotor being surrounded by a master stator which is selected from a plurality of such master stators to match the characteristics of the rotor, the rotation of the rotor under test load conditions being timed over a predetermined period. After the test has been completed, the rotor is ejected from its test position and guided to one of a plurality of output channels, thus being graded according to the results of the test. Various cooling arrangements are provided to cool the various parts of the apparatus whilst a test is being carried out.

7 Claims, 6 Drawing Figures

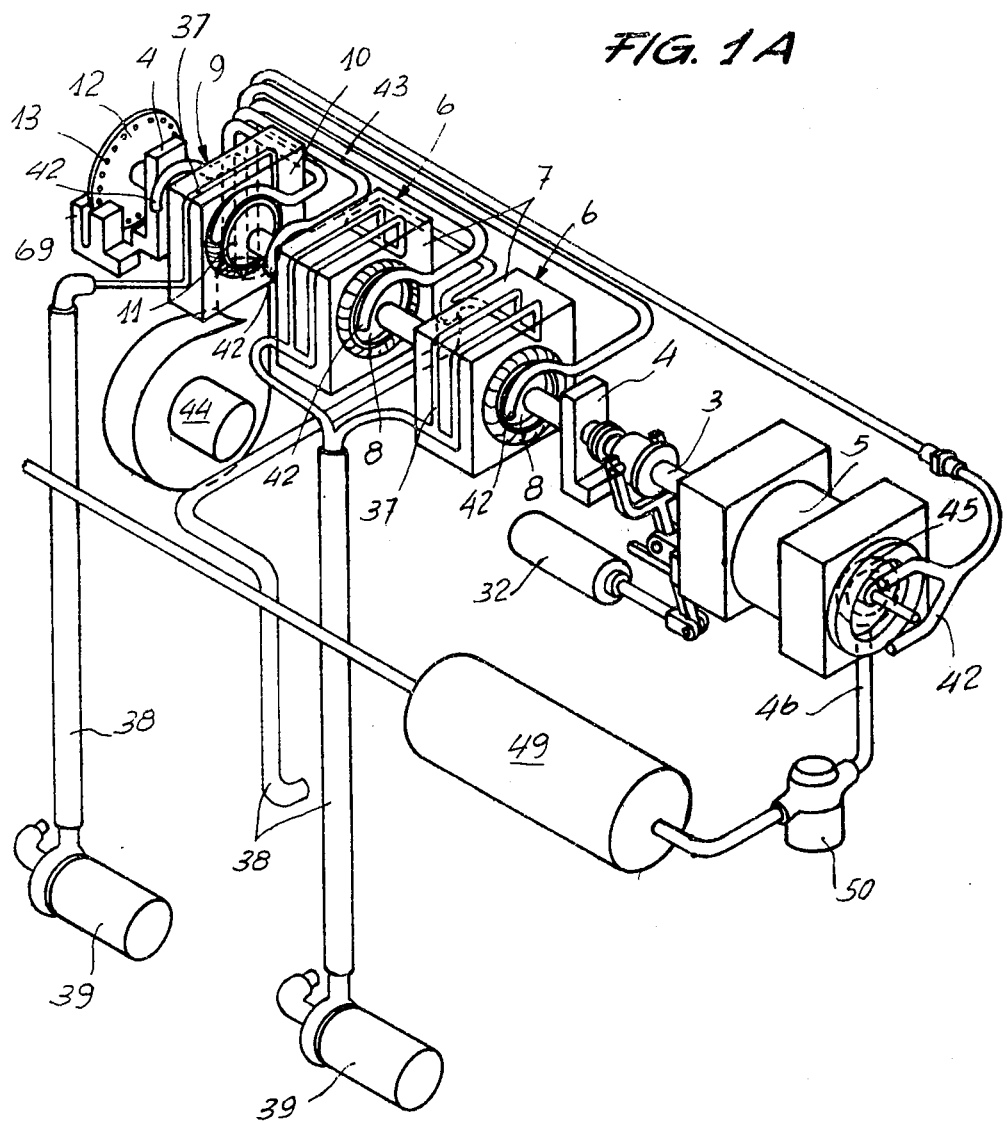

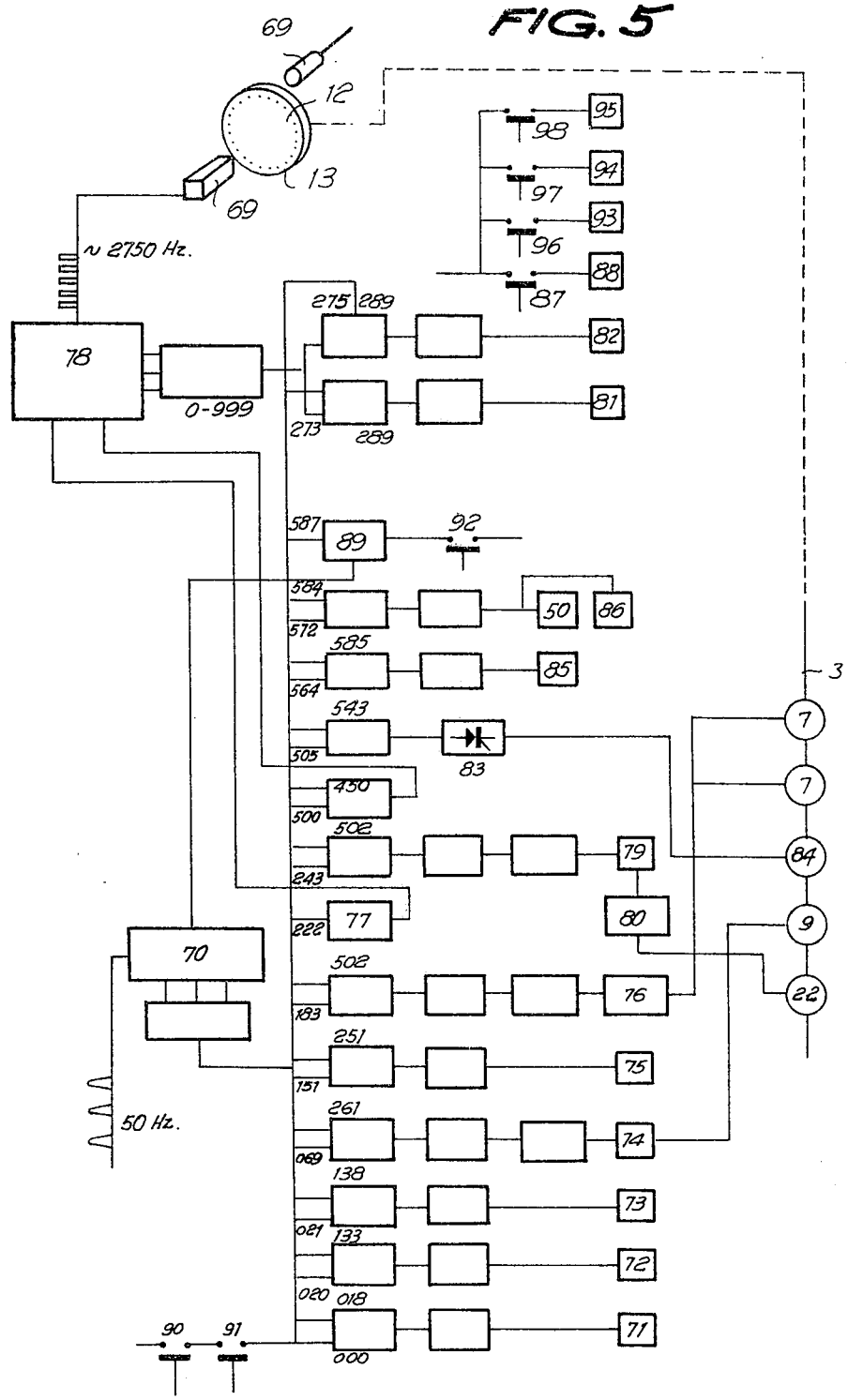

APPARATUS FOR TESTING ROTORS OF ELECTRIC MOTORS

FIELD OF THE INVENTION

The present invention relates to apparatus specially designed for effecting the rapid testing, as an additional step in the mass production process, of rotors for electric drive motors intended to form a part of various devices.

It is based on the principle of mounting a rotor to be tested on a master stator which is supplied with a stabilized A.C. voltage bringing it up to the rated speed and causing it to drive a single-phase induction motor fed with a stabilized D.C. voltage, thereby obtaining a constant load for the test or master motor, based on the fact that the driven motor acts as a brake due to parasitic current. The assembly is stabilized at a velocity at which the driving torque supplied by the test motor assembly and the resistant torque offered by the parasitic current brake are balanced. Since this velocity is a function of various parameters, of which the only variable parameter is the rotor arranged in the master stator for each test, it is clear that the velocity will be proportional to the electrical resistance of the rotor cage and the magnetic properties of the iron thereof, thus affording an indication of the electro-magnetic quality of the assembly of the tested rotor. An electronic system makes it possible to analyze the velocity and to establish whether the tested rotor possesses the specified conditions, or alternatively, to effect a selection between various quality catagories or degrees.

SUMMARY OF THE INVENTION

According to the present invention there is provided apparatus for testing rotors of electric motors including: a housing; a rotatable shaft; bearings secured to the housing and rotationally supporting the shaft; a releasable clamping device mounted on said shaft for holding the rotors to be tested; a master stator selected from one of a plurality of master stators, each corresponding to a type of rotor to be tested; means for securing the selected master stator to the housing about the shaft at a position where it will surround the rotor to be tested when in position; means for energizing said stator with a stabilized A.C. voltage; at least one induction motor having a rotor and stator, the rotor being coupled to said shaft for driving the rotor under test, and the stator being energized with a stabilized D.C. voltage; means for carrying out programmed tests on the rotor to be tested under load conditions; means for loading and unloading the rotors to be tested to and from the clamping device at the start and finish of one test cycle; and means for routing the tested rotors along different channels according to the results of the test.

In a preferred embodiment of the invention, the shaft has a free end constituting a spindle for receiving the test rotors, and is provided with a coaxial securing device, the end of the spindle extending externally of the master stator, where it is associated with a rotor loading and unloading device provided with an unloading ramp in which are arranged deflector devices associated with machine control means for distributing the tested rotors in accordance with the results of the test. For the purpose of ejecting the tested rotors, the master stator comprises a nozzle device fed with compressed air through an electro-magnetic valve controlled by the drive devices, and located axially opposite the inner face or base of the rotor undergoing testing.

Forced cooling means may be provided in the various electro-magnetic elements. For example, on the one hand the stators may be provided with circulation ducting connected with a cooling unit and, on the other hand, with nozzles located opposite the rotors and connected with an installation for supplying pressure air.

Additionally, the control devices may include an electronic counter operated from the mains frequency as a time-base function, for the excitation of circuit means actuating the elements of the machine in a test sequence, and an electronic counter actuated by pulses proportional to the rotational velocity of the shaft, for the excitation of circuit means actuating the distributor devices of the tested rotors as a function of the comparison result in respect of the outputs of both counters.

BRIEF DESCRIPTION OF DRAWINGS

The present invention will now be described in greater detail by way of example with reference to the accompanying drawings, wherein:

FIG. 1A is a detailed perspective view on a larger scale, of part of the apparatus shown in FIG. 1;

FIG. 5 is a block circuit diagram of the electronic control circuit for use with the rotor testing machine shown in FIG. 1.

DESCRIPTION OF THE PREFERRED EMBODIMENT

Figure 1:
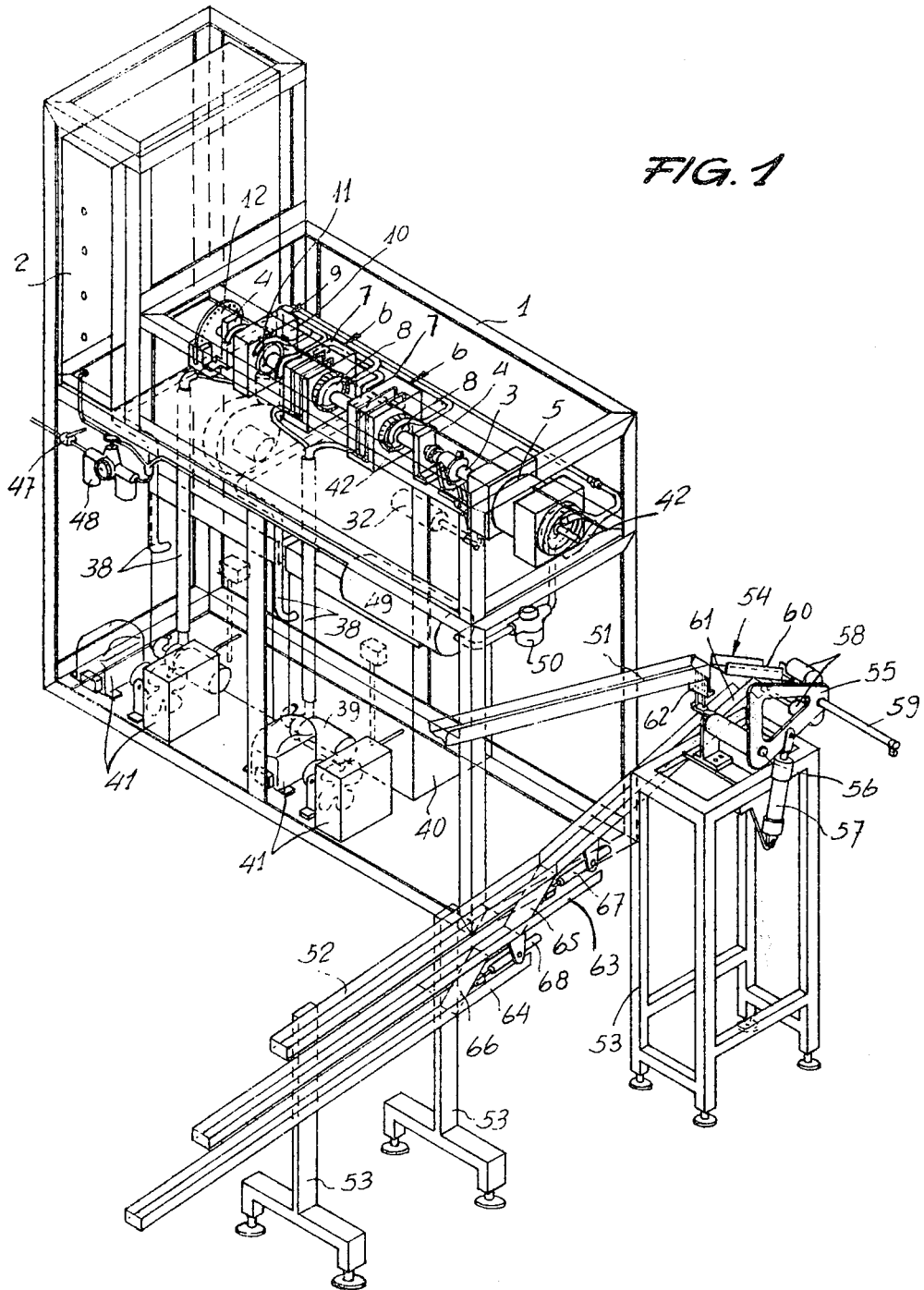
FIG. 1 is a perspective view of one preferred form of rotor testing apparatus, for testing squirrel cage rotors, the machine being shown with the cover panels removed to show the apparatus.

Referring to FIG. 1, the rotor testing machine is contained within a housing 1 constructed of metal section members and enclosed by sheet metal panels. Within the housing 1 is located a box 2 which contains the electronic systems. The main elements of the rotor testing machine are grouped in the upper portion of the housing 1 along a shaft 3, rotationally supported by means of fixed bearings 4.

Mounted on the shaft 3 are, from right to left in FIG. 1, a testing head 5, two induction motors 6 each having a stator 7 and a rotor 8, a further induction motor 9 having a stator 10 and a rotor 11, and a disc 12 formed with a circular series of holes 13.

Figure 2:
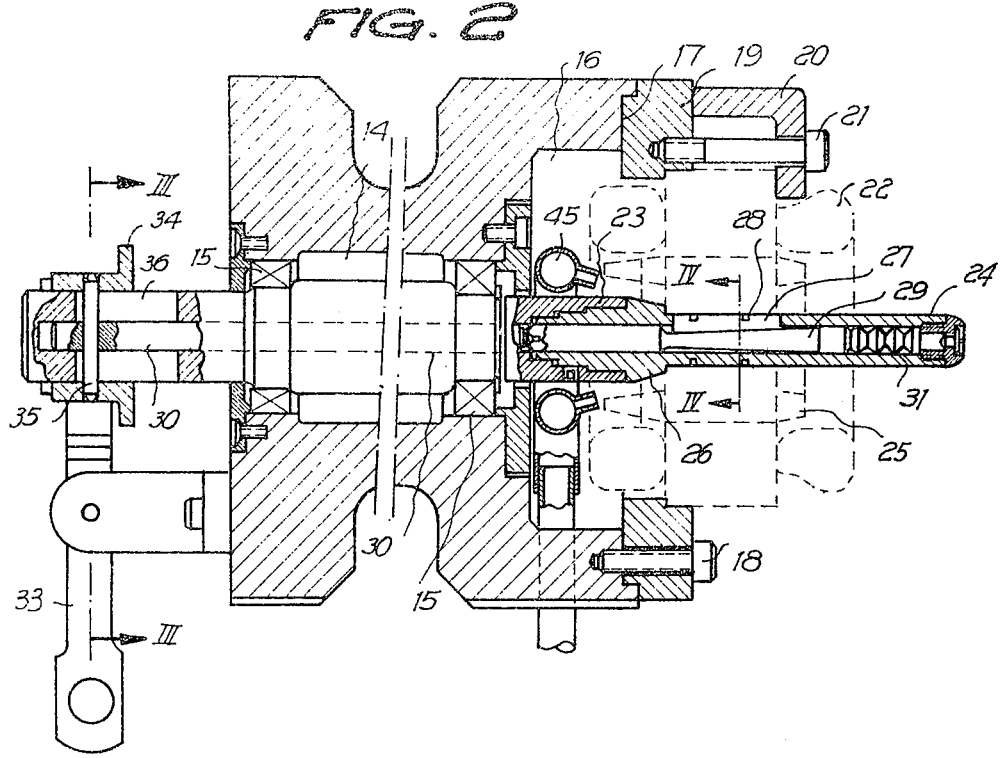
FIG. 2 is a sectional elevational view showing the test head of the machine shown in FIG. 1.
Figure 3:
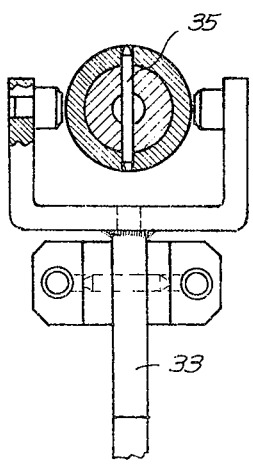
FIG. 3 is a cross section of the test head taken along the line III—III of FIG. 2.

Referring to FIG. 2, the test head 5 is a block having a lower face for mounting on the bench and a bearing cage 14 in which the end of the shaft 3 is supported by means of bearings 15. The outer end of the block affords a socket 16 having an annular seat 17 in which an adaptor device for various types of stator is secured, by means of threaded bolts 18. The adaptor device comprises a support ring 19 and the clamps 20 provided with threaded bolts 21. A master stator 22 suitable for each type of rotor which it is required to test, can be secured in the machine coaxially with the shaft 3, by means of the adaptor device.

The end of the shaft 3 is provided with a threaded coupling 23 in which a tubular spindle 24 is coupled.

Figure 4:
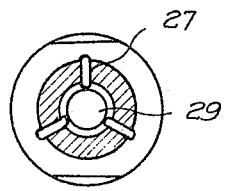
FIG. 4 is a cross section of the test head taken along the line IV—IV of FIG. 3.

The diameter of the spindle 24 is of a size suitable for the rotors to be tested. The outline of the rotor to be tested is indicated at 25 by the dotted lines. The spindle 24 is provided with a shoulder 26 which defines the abutment position of the said rotor. As shown in FIG. 4, the spindle 24 is also provided with a securing device constituted by three claws 27 sliding in radial apertures formed in the spindle. These claws 27 are urged inwards by means of resilient rings 28, and urged outwards by means of a cone 29 bearing on the end of an actuating rod 30. The rod 30 is urged towards the securing position by means of a Belleville spring stack 31 but can be displaced, for releasing the rotor, by means of a pneumatically actuated cylinder 32 (FIG. 1). The piston of the pneumatic cylinder is connected to a forked lever 33 articulated to a thrust ring 34 sliding on the shaft 3. The thrust ring 34 is connected to the actuating rod 30 by means of a pin 35 extending through a longitudinal cage 36 on the shaft 3. The cone 29 is driven by compression, by the rod 30, so that the spindle assembly is readily dismountable from the exterior of the machine, so that different types of spindle assembly can be used according to the types of rotor to be tested.

The stators of the three induction motors 6 and 9 are provided with inner conduits or ducts 37, the ends of which are connected to pipes 38. These elements together with circulating pumps 39 and a reservoir 40 for coolant, for example brine, constitute a cooling circuit from which heat is extracted by means of the conventional cooling unit 41. In addition, the stators are cooled by means of perforated tubes 42 constituting injection nozzles. The tubes 42 are connected to a centrifugal fan 44 by means of ducts 43.

For loading and unloading the test rotors 25, the machine comprises, within the socket 16, an annular nozzle 45 which is connected to a supply tube 46. The tube 46 is connected to a compressed air system (not shown). Between the compressed air supply and the nozzle 45, there is provided a shut-off valve 47, a regulator-conditioner 48, an accumulator 49 and a control electro-magnetic valve 50. The blast of air from the annular nozzle 45 pushes on the exterior of the rotor 25 which is located in the testing position, so as to urge it towards the feed apparatus shown in FIG. 1. The feed apparatus includes a loading ramp 51 and an outlet ramp 52, supported by means of appropriate supports 53. One end of both ramps 51 and 52 is associated with a transfer device 54. The transfer device 54 includes a frame 55 adapted to oscillate about a pivot 56 and driven by a pneumatic drive cylinder 57. A doublethrust device 58 is displaceable by drive means 59 connected to the frame 55 for displacing rotors from the end of a ramp 60 to the testing seat 61 before a test is carried out, and also at the end of a test from the end of the ramp 51 to one of the outlet ramps 52 through a gate 62. The unloading or discharging ramp 52 is subdivided into further two ramps 63 and 64 successively accessible via ramp shafts 65 and 66 actuated by pneumatic actuators 67 and 68 which are actuated or not by the control system, in accordance with the results of the test obtained from each rotor tested.

The master stator 22 is supplied with stabilized A.C. voltage which thus provides a reference voltage for the tests. The stators of the two motors 6 are excited with stabilized D.C. voltage thereby imparting substantially constant frictional resistance to the rotation of the rotors thereof. The motor 9 is of conventional type. The disc 12 is associated with a photo-electric signal input device 69 scanning through the holes 13 of the disc and generating data pulses for the electronic control system.

The electronic system is shown in block form in FIG. 5. The operation of this circuit is as follows.

At the instant at which the mains pulse counter 70 is in the 000 position (at the start of a cycle) and the series of end of travel means indicates that the machine is at the mechanical zero position, an impulse is provided to operate an electro-magnetic valve 71 which actuates the pneumatic cylinder 59, thereby introducing the rotor into the master stator. At the instant 020, an electro-magnetic valve 72 is energized which operates a pneumatic actuator (not shown) in order to expand the rotor securing gripper. At the instant 021, the electro-magnetic valve 71 is again energized by an impulse (indicated at 73 in FIG. 5) for returning the rotor-urging means to the starting position.

At the instant 069, a contactor 74 is closed to provide current in order to start the induction motor 9, so as to rotate the shaft 3 of the assembly to the speed at which the rotor under test is to be tested at.

On reaching the instant 151, an electro-magnetic valve 75 is energized which actuates the pneumatic drive cylinder 57 for raising the frame 55 and putting it into the appropriate position for receiving the tested rotor, on the cycle being completed.

At the instant 183, a source 76 of stabilized D.C. current is connected into the circuit in order to supply power to the two stators 7 which will provide a constant resistance to the rotation of the assembly, acting as braking means for parasitic currents. At the instant 222, a gate and an inverter 77 supply a pulse for resetting to zero a revolution counter 78, for erasing the reading of the previous test. On reaching the instant 243, a contactor 79 is closed to bring into the circuit a source 80 of stabilized A.C. current which is supplied to the master stator 22. At the instant 261, the contactor 74 is opened to disconnect the supply to the induction motor 9. On reaching the instant 289, the current supply to electro-magnetic valves 81 and 82, which operate the actuating cylinders 67 and 68 of the selection channels, is interrupted, on the assumption that the electrode circuit will have selected one of these channels in the previous cycle.

On reaching the instant 450, the signal for preventing the counting of the revolution counter ceases to be operative, thereby initiating counting of the pulses emitted by the photo-electric detector device 69 until the instant 500 is reached at which the counter is stopped. If the mains frequency is 50 Hz and each pulse is equivalent to 0.02 sec, the time elapsed between the instants 450 and 500 is 500 − 450 = 50 pulses which is precisely equivalent to 1 second. Consequently, the numerical value attained by the revolution counter will be the number of pulses emitted per second, which are exactly proportional to the velocity of the assembly. If the numerical value attains one of two values which are capable of being conventionally programmed in the circuit, one or both of the cylinders 67 and 68 will be actuated, effecting a corresponding selection of the output channel for the tested rotor.

At the instant 502, firstly a contactor 79 is opened which interrupts the current to the master stator 22, and secondly, a contactor 76 is opened to interrupt the current supply to the stators 7. A few seconds later, on reaching the instant 505, a second winding 84 of the starting motor is supplied with D.C. current by means of a thyristor 83. The second winding 84 is designed to operate as a brake for parasitic currents, thereby bringing about the rapid braking of the assembly.

At the instant 564, an electro-magnetic valve 85 is operated. This valve 85 controls the cylinder 32 for actuating the device for securing the test rotor, thereby releasing it from the spindle 24. At the instant 572, a pulse is supplied to actuate the electro-magnetic valve 50, thereby producing a jet of compressed air to expel the tested rotor. Next, an electro-magnetic counter 86 counting the cycle number is tripped. This counter 86 counts the total number of the tested rotors. The rotor, on leaving the test position, trips a limit switch 87 which causes actuation of the cylinder 57 through the operation of an electro-magnetic valve 88. This returns the frame 55 (previously actuated for receiving the rotor) to its initial position.

On reaching the instant 587, the gate 89 generates a pulse resulting in the resetting to zero and blocking of the mains pulse counter 70. When the pulse counter has been reset to 000, and when the frame of the loading mechanism has returned to its position (as just stated), the circuit comprising a series of safety limit switches 90 and 91 is closed, so that the assembly remains in the initial position and the machine commences a fresh cycle. At the end of the travel movement for the introduction of the fresh rotor, the double-thrust device 58 which effects this result actuates a limit switch 92, which supplies a pulse through the gate 89 to restart the main pulse counter 70, thereby initiating a fresh cycle. Simultaneously, the mechanism deposits the tested rotor on the unloading ramps where it will be selected in accordance with the positions of the doors established during the test just completed.

In the above described embodiment with reference to FIG. 5, no detailed description has been given of the unreferenced blocks within each circuit, or with respect to the function of each circuit, since the circuits involved are operational circuits of conventional type. Nevertheless, mention should be made of the existence of electronic counting devices 93, 94 and 95 which are triggered by limit switches or equivalent contactors 96, 97 and 98, for counting the "partial totals" of rotors selected as a function of quality.

In some parts of the description, there will be observed that there is some duplication in respect of controls for one and the same function. This is related to the use of double-effect servo-valves, the cylinders of which are actuated via single, independent electro-magnetic valves, or by means of independent actuating electro-magnets. It will however be clear that any other conventional arrangement having the same effect could equally well be utilized, provided that suitable modifications are effected.

The mechanism for supplying and unloading rotors could also be replaced by any other arrangement, depending on specific requirements in the industry concerned.

Finally, although the above described embodiment relates to a machine for testing squirrel cage rotors, the machine could be appropriately modified to test rotors of other types of electrical machines.

What we claim and desire to secure by Letters Patent is:

1. Apparatus for testing rotors of electric motors including: a housing; a rotatable shaft; bearings secured to the housing and rotationally supporting the shaft; a releasable clamping device mounted on said shaft for holding the rotors to be tested; a master stator selected from one of a plurality of master stators, each corresponding to a type of rotor to be tested; means for securing the selected master stator to the housing about the shaft at a position where it will surround the rotor to be tested when in position; means for energizing said stator with a stabilized A.C. voltage whereby said master stator and rotor under test operate as a drive motor: at least one induction motor having a rotor and stator, the rotor of said induction motor being coupled to said shaft and the stator of said induction motor being energized with a stabilized D.C. voltage thereby obtaining a constant load for said drive motor; means for carrying out programmed tests on the rotor to be tested under said load conditions; means for loading and unloading the rotors to be tested to and from the clamping device at the start and finish of one test cycle; and means for routing the tested rotors along different channels according to the results of the test, the releasable clamping device for rotors to be tested comprising a threaded coupling mounted on the end of the shaft; a tubular spindle coupled to said coupling; an abutment shoulder on said spindle for making contact with one end face of the rotor to be tested; a plurality of radial apertures in said spindle and a plurality of claws, one each within an aperture for engaging said rotor to be tested.

2. Apparatus according to claim 1, wherein said releasable clamping device additionally includes resilient rings on said spindle for urging the claws inwards; a cone shaped member slidably located within the tubular member for urging said claws outwards in order to grip the rotor to be tested; a spring stack urging said cone towards the position in which it forces the claws to engage the rotor to be tested; and pneumatically operated means for urging said cone to move away from the engaging position against the action of the spring stack.

3. Apparatus for testing rotors of electric motors including: a housing; a rotatable shaft; bearings secured to the housing and rotationally supporting the shaft; a releasable clamping device mounted on said shaft for holding the rotors to be tested; a master stator selected from one of a plurality of master stators, each corresponding to a type of rotor to be tested; means for securing the selected master stator to the housing about the shaft at a position where it will surround the rotor to be tested when in position; means for energizing said stator with a stabilized A.C. voltage whereby said master stator and rotor under test operate as a drive motor: at least one induction motor having a rotor and stator, the rotor of said induction motor being coupled to said shaft and the stator of said induction motor being energized with a stabilized D.C. voltage thereby obtaining a constant load for said drive motor; means for carrying out programmed tests on the rotor to be tested under said load conditions; means for loading and unloading the rotors to be tested to and from the clamping device at the start and finish of one test cycle; and means for routing the test rotors along different channels according to the results of the test, there being three induction motors, the stator of each motor having inner conduits; at least one circulating pump; a reservoir for liquid coolant; and piping connecting the inner conduits to the pump and reservoir to form at least one closed loop system.

4. Apparatus according to claim 3, wherein the stator of each induction motor additionally includes a perforated tube constituting a series of injection nozzles; a fan; and ducts connecting the perforated tube to the fan for providing additional means for cooling the stators of the three induction motors.

5. Apparatus for testing rotors of electric motors including: a housing; a rotatable shaft; bearings secured to the housing and rotationally supporting the shaft; a releasable clamping device mounted on said shaft for holding the rotors to be tested; a master stator selected from one of a plurality of master stators, each corresponding to a type of rotor to be tested; means for securing the selected master stator to the housing about the shaft at a position where it will surround the rotor to be tested when in position; means for energizing said stator with a stabilized A.C. voltage whereby said master stator and rotor under test operate as a drive motor: at least one induction motor having a rotor and stator, the rotor of said induction motor being coupled to said shaft and the stator of said induction motor being energized with a stabilized D.C. voltage thereby obtaining a constant load for said drive motor; means for carrying out programmed tests on the rotor to be tested under said load conditions; means for loading and unloading the rotors to be tested to and from the clamping device at the start and finish of one test cycle; and means for routing the tested rotors along different channels according to the results of the test, for releasing the tested rotor from the clamping device there being provided an annular nozzle device mounted around the end of the shaft with its nozzles facing the end of the rotor under test when in position; a compressed air system; an electro-magnetically operated valve; and piping connecting said system to the annular nozzle device through the electro-magnetically operated valve, whereby when said test has been completed the valve is energized to supply compressed air to said annular nozzle device in order to eject the rotor.

6. Apparatus for testing rotors of electric motors including: a housing; a rotatable shaft; bearings secured to the housing and rotationally supporting the shaft; a releasable clamping device mounted on said shaft for holding the rotors to be tested; a master stator selected from one of a plurality of master stators, each corresponding to a type of rotor to be tested; means for securing the selected master stator to the housing about the shaft at a position where it will surround the rotor to be tested when in position; means for energizing said stator with a stabilized A.C. voltage whereby said master stator and rotor under test operate as a drive motor: at least one induction motor having a rotor and stator, the rotor of said induction motor being coupled to said shaft and the stator of said induction motor being energized with a stabilized D.C. voltage thereby obtaining a constant load for said drive motor; means for carrying out programmed tests on the rotor to be tested under said load conditions; means for loading and unloading the rotors to be tested to and from the clamping device at the start and finish of one test cycle; and means for routing the tested rotors along different channels according to the results of the test, the means for loading and unloading the rotors including: a loading ramp; an unloading ramp; a plurality of outlet ramps; a transfer device for loading the rotors to be tested on to the loading ramp and for unloading the tested rotors on to the unloading ramp; and gate means for directing said unloaded and tested rotors into one of the plurality of outlet ramps according to the results of the test, the transfer device including an oscillating frame; a double-thrust device; drive means operatively connecting the double-thrust device with the oscillating frame; said double-thrust device controlling the movement of rotors on to and off from the loading ramp; and pneumatically operated means for oscillating said frame to control the movement of said rotors.

7. Apparatus for testing rotors of electric motors including: a housing; a rotatable shaft; bearings secured to the housing and rotationally supporting the shaft; a releasable clamping device mounted on said shaft for holding the rotors to be tested; a master stator selected from one of a plurality of master stators, each corresponding to a type of rotor to be tested; means for securing the selected master stator to the housing about the shaft at a position where it will surround the rotor to be tested when in position; means for energizing said stator with a stabilized A.C. voltage whereby said master stator and rotor under test operate as a drive motor: at least one induction motor having a rotor and stator, the rotor of said induction motor being coupled to said shaft and the stator of said induction motor being energized with a stabilized D.C. voltage thereby obtaining a constant load for said drive motor; means for carrying out programmed tests on the rotor to be tested under said load conditions; means for loading and unloading the rotors to be tested to and from the clamping device at the start and finish of one test cycle; and means for routing the testing rotors along different channels according to the results of the test, the means for carrying out programmed tests including a disc mounted on the shaft; a plurality of apertures arranged in a circle coaxial with the shaft in equispaced relation therearound; a source of electromagnetic radiation positioned on one side of the disc in alignment with the rotating apertures and a photoelectric sensor positioned on the other side to receive electro-magnetic radiation through the apertures; a pulse counter connected to the output from the photo-electric sensor for counting the revolutions of the shaft; and means for starting and stopping said counter so as to count the revolutions of the shaft during specified periods whilst the rotor is under test, and additionally including a second counter operated from the main supply for controlling the programmed sequence of events during the test of the rotor.

* * * * *